(12) United States Patent
Aoyama et al.

(10) Patent No.: US 8,213,283 B2
(45) Date of Patent: Jul. 3, 2012

(54) INFORMATION RECORDING METHOD FOR OPTICAL RECORDING MEDIUM AND OPTICAL RECORDING APPARATUS

(75) Inventors: Tsutomu Aoyama, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 629 days.

(21) Appl. No.: 11/880,579

(22) Filed: Jul. 23, 2007

(65) Prior Publication Data

US 2008/0025180 A1 Jan. 31, 2008

(30) Foreign Application Priority Data

Jul. 26, 2006 (JP) .................. 2006-202931

(51) Int. Cl.
*G11B 7/00* (2006.01)
(52) U.S. Cl. .................. 369/59.11; 369/47.5
(58) Field of Classification Search .......... 369/59.11, 369/59.12, 116, 47.5–47.53
See application file for complete search history.

(56) References Cited

U.S. PATENT DOCUMENTS

| | | | |
|---|---|---|---|
| 5,109,373 A | 4/1992 | Ohno et al. | |
| 5,412,626 A | 5/1995 | Ohno et al. | |
| 5,732,062 A * | 3/1998 | Yokoi et al. ................ | 369/116 |
| 5,825,742 A * | 10/1998 | Tanaka et al. ............. | 369/59.11 |
| 6,125,085 A * | 9/2000 | Fuji et al. .................. | 369/116 |
| 6,188,656 B1 | 2/2001 | Shoji et al. | |
| 7,050,367 B1 * | 5/2006 | Negishi et al. ............. | 369/59.11 |
| 7,643,387 B2 * | 1/2010 | Kim et al. .................. | 369/44.26 |
| 2001/0012253 A1 | 8/2001 | Ohno | |
| 2001/0053115 A1 | 12/2001 | Nobukuni et al. | |
| 2003/0067857 A1 | 4/2003 | Shirota et al. | |
| 2004/0136307 A1 | 7/2004 | Ito et al. | |
| 2004/0145985 A1 | 7/2004 | Osakabe | |
| 2005/0063273 A1 | 3/2005 | Shingai et al. | |
| 2005/0063274 A1 * | 3/2005 | Nagano et al. ............. | 369/59.11 |
| 2005/0105438 A1 | 5/2005 | Hibino et al. | |
| 2005/0147007 A1 | 7/2005 | Nakano et al. | |
| 2005/0147012 A1 * | 7/2005 | Hwang et al. ............. | 369/59.11 |
| 2005/0207308 A1 * | 9/2005 | Kobayashi et al. ........ | 369/59.11 |
| 2005/0243677 A1 | 11/2005 | Kobayashi et al. | |

FOREIGN PATENT DOCUMENTS

| | | |
|---|---|---|
| JP | 3-185628 | 8/1991 |
| JP | 612674 A | 1/1994 |
| JP | 2000231715 A | 8/2000 |
| JP | 2001273638 A | 10/2001 |
| JP | 2001331936 A | 11/2001 |
| JP | 2002-288830 | 4/2002 |
| JP | 2003-81631 A | 3/2003 |
| JP | 2003085753 A | 3/2003 |
| JP | 2004111020 A | 4/2004 |
| JP | 2004146040 A | 5/2004 |
| JP | 2004213743 A | 7/2004 |

(Continued)

*Primary Examiner* — Thang Tran

(74) *Attorney, Agent, or Firm* — Porzio, Bromberg & Newman, P.C.

(57) ABSTRACT

A recording method suitable for high-density recording is provided to increase the reproduction quality. An optical information recording method is for recording information on an optical recording medium by irradiation of a write pulse of a laser beam to perform reproduction in a production system using a PRML detection scheme. The method includes recording a recording mark by a single write pulse, when the total length of the recording mark to be recorded and a space adjacent to the recording mark is less than a diameter of an effective reproduction spot, being $0.82 \times (\lambda/NA)$, where $\lambda$ is a wavelength of a reproduction laser beam and NA is a numerical aperture.

8 Claims, 14 Drawing Sheets

FOREIGN PATENT DOCUMENTS

| | | |
|---|---|---|
| JP | 2005063586 A | 3/2005 |
| JP | 2005071516 A | 3/2005 |
| JP | 2005228383 A | 8/2005 |
| JP | 2006172667 A | 6/2006 |
| JP | 2006-250162 A | 9/2006 |
| JP | 2006-251693 A | 9/2006 |

* cited by examiner (A)

| Capacity(GB) | Length corresponding to 2T | Length corresponding to 3T | Length corresponding to 4T | 2T mark + 2T space | 3T mark + 2T space | 4T mark + 2T space |
|---|---|---|---|---|---|---|
| 25 | 149 | 224 | 298 | 298 | 373 | 447 |
| 26.1 | 143 | 214 | 285 | 285 | 357 | 428 |
| 27.3 | 136 | 205 | 273 | 273 | 341 | 409 |
| 28.4 | 131 | 197 | 262 | 262 | 328 | 393 |
| 29.5 | 126 | 189 | 253 | 253 | 316 | 379 |
| 30 | 124 | 186 | 248 | 248 | 310 | 373 |
| 33 | 113 | 169 | 226 | 226 | 282 | 339 |

NOTE: The unit of length is nm.

<30 GB STORAGE CAPACITY, 1x WRITE SPEED>

| Evaluation method | Example 1 | Comparative Example 1 |
|---|---|---|
| PRSNR | 16.8 | 15.8 (Start write-pulse width 5nsec) |
| SbER | 5.5E-07 | 3.4E-06 (Start write-pulse width 5nsec) |

Fig. 14

Comparative example 2 <25 GB STORAGE CAPACITY, 1x WRITE SPEED>

| Evaluation method | Write strategy for Example 1 | Write strategy for Comparative Example 1 |
|---|---|---|
| PRSNR | 22.3 | 23.0 (Start write-pulse width 5nsec) |
| SbER | 3.9E-08 | 4.6E-08 (Start write-pulse width 5nsec) |

INFORMATION RECORDING METHOD FOR OPTICAL RECORDING MEDIUM AND OPTICAL RECORDING APPARATUS

BACKGROUND OF THE INVENTION

1. Field of the Invention

The present invention relates to a method and apparatus for recording information on an optical recording medium, and in particular, to a method and apparatus for irradiating the optical recording medium with a laser beam using pulse control during recording, wherein the method and apparatus take into account the conditions of the medium during reproduction.

2. Description of the Related Art

Various standards of optical recording media such as CD-R/RWs and DVD-R/RWs, which allow the user to record information, have been widely used. Meanwhile, the demand for large storage capacity in these types of optical recording media is increasing year by year. In order to meet this demand, new standards such as Blu-ray discs (BDs) have been proposed. An optical disc apparatus under the Blu-ray standard uses a data recording/reproduction laser beam with a narrow beam spot diameter. Specifically, the apparatus uses a laser beam with a shorter wavelength λ and a higher numerical aperture (NA) objective lens for condensing the laser beam. As a result, a Blu-ray disc is capable of recording about 25 GB data on its information recording layer.

In general, rewritable optical recording media, which allow rewriting data, use a recording film made of a phase change material. Specifically, by heating the recording film by irradiation with a laser beam and appropriately controlling the cooling rate thereafter, an amorphous region and a crystal region are selectively formed in the film, and the difference in reflectivity between these regions achieves recording information. To do so, the laser beam is required to be set under various conditions such as a write power level (Pw) with a high energy, an erase power level (Pe) with a middle energy, and a bias power level (Pb) with a low energy. Recording information on the optical recording medium is performed by pulse irradiation of the laser beam with any selected one of the three power levels.

Irradiating the optical recording medium alternately with a write pulse with the write power level and a bias pulse with the bias power level forms a mark thereon. The recording film is irradiated with the write pulse, so that the irradiated region is heated to its melting point or more. When the same region is then irradiated with the bias pulse, the area is rapidly cooled and thus is turned to an amorphous recording mark. Therefore, if the set of the write pulse and the bias pulse is continuously applied, it is possible to form a long recording mark.

Irradiating the optical recording medium with an erase pulse with the erase power level erases a mark having been recorded on the optical recording medium. The recording film is irradiated with the erase pulse, so that the irradiated region is heated to its crystallization temperature or more. The whole irradiated region, including the amorphous region (mark), is then crystallized by natural cooling, so that the recording mark is erased.

Accordingly, recording information is performed in such a manner that a region where a mark is to be formed is continuously irradiated alternately with the write pulse and the bias pulse according to the length of the mark, and a region where a space is to be formed is irradiated with the erase pulse according to the length of the space. This power modulation is called a write strategy.

Increasing the recording density as well as the write speed causes an edge shift on the recording mark. For example, when a long recording mark such as 6T is formed by a plurality of write pulses, too high write speed makes it hard to ensure sufficient cooling time, which corresponds to the width of the bias pulse between the write pulses. This poor cooling causes a part of the mark to recrystallize, and thus may degrade the recording quality. Therefore, in order to increase the recording accuracy, accurate control of the laser pulse is required, and there are various approaches therefore.

For example, Japanese Patent Application Laid-Open No. 2005-71516 discloses that, when writing each mark, the width of a bias pulse which is inserted into the end of the mark is varied depending on the length of the mark so as to reduce the jitter of a production signal. Moreover, when writing each mark, a bias pulse is inserted additionally into the top of the mark so as to delay the rising of the first write pulse. Similarly, Japanese Patent Application Laid-Open Nos. 2005-63586 and 2002-288830 disclose that at the beginning of writing a mark, a pulse with a power level lower than that of an erase pulse is inserted so as to prevent the top area of the mark from recrystallizing.

Japanese Patent Application Laid-Open No. 2001-273638 discloses that, when forming a mark with a 4T length or more, a bias pulse is inserted so as to prevent the mark from recrystallizing. The publication of Japanese Patent No. 2707774 discloses that, when forming a long mark by, for example, three write pulses or more, a bias pulse is inserted either before a top write pulse or after an end write pulse so as to sharpen the leading or trailing edge of the mark.

However, a further increase in storage capacity increases the recording density of the information recording layer, thereby degrading the quality of the reproduction signal. This makes it hard to identify a bit using zero-crossing detection. Moreover, this makes it hard to determine the signal quality using the jitter. Therefore, a Partial Response, Maximum Likelihood (PRML) detection scheme is needed for signal reproduction. Specifically, what is needed is a measurement of reproduction light in multiple levels to detect a reproduction response (reproduced waveform) and a choice of an ideal response suitable for the reproduction response. Accordingly, a distorted reproduced waveform causes an inadequate ideal response to be chosen, thereby leading to read error.

A study by the inventors, but is not in the public domain on the filing date of this application, showed that a recording state where a cycle of recording mark/space falls within the diameter of an effective spot for reproduction is subject to read error. They concluded that the fact that a cycle of recording mark/space falls within the diameter of the effective spot suggests that at least a part of another mark other than the recording mark is in the effective spot as well and that this another mark interferes in the recording mark so as to distort the reproduced waveform of the recording mark. In particular, a relatively short mark such as 2T, 3T, and 4T mark, which shows a reproduced waveform with a small amplitude, has an adverse effect on the choice of an ideal response even if the reproduced waveform is distorted a little.

All the patent documents cited above are to perform a precise pulse control of all marks or relatively long marks. Therefore, the application of such a control without any modification cannot solve the above problems and thus is unable to fully perform high-density recording.

SUMMARY OF THE INVENTION

The present invention has been developed in view of the foregoing, and it is an object of the present invention to increase recording accuracy on an optical recording medium by performing a pulse control suitable for high-density recording.

As a result of an intensive study, the inventors have developed a control of the write pulse for producing a recording mark under prediction of the conditions of the medium during reproduction. Accordingly, the object of the present invention is achieved by the following means.

To achieve the aforementioned object, a first aspect of the present invention is an optical information recording method for recording information on an optical recording medium by irradiation of a write pulse of a laser beam to perform reproduction in a reproduction system using a PRML detection scheme, the method including: recording a recording mark by a single write pulse, when the total length of the recording mark to be recorded and a space adjacent to the recording mark is less than a diameter of an effective reproduction spot, being $0.82\times(\lambda/NA)$, where $\lambda$ is a wavelength of a reproduction laser beam and NA is a numerical aperture.

To achieve the aforementioned object, a second aspect of the present invention is the optical information recording method according to the aforementioned aspect, wherein the recording mark is recorded by a single write pulse, when the space is a shortest space.

To achieve the aforementioned object, a third aspect of the present invention is the optical information recording method according to the aforementioned aspects, wherein the recording mark to be recorded by a single write pulse includes a recording mark with a 4T length, where T is one clock cycle.

To achieve the aforementioned object, a fourth aspect of the present invention is the optical information recording method according to the aforementioned aspects, wherein a set of the recording mark to be recorded by a single write pulse and the space adjacent to the recording mark includes a set of a 2T recording mark and a 2T space, a set of a 3T recording mark and a 2T space, and a set of a 4T recording mark and a 2T space, where T is one clock cycle.

To achieve the aforementioned object, a fifth aspect of the present invention is the optical information recording method according to the aforementioned aspects, wherein the set of the recording mark to be recorded by a single write pulse and the space adjacent to the recording mark further includes a set of a 2T recording mark and a 3T space.

To achieve the aforementioned object, a sixth aspect of the present invention is the optical information recording method according to the aforementioned aspects, wherein an nT mark with a length corresponding to nT, except for the recording mark to be recorded by a single write pulse, is recorded by a write pulse of an n−1 write strategy, where T is one clock cycle and n is a natural number.

To achieve the aforementioned object, a seventh aspect of the present invention is the optical information recording method according to the aforementioned aspects, wherein an nT mark with a length corresponding to nT, except for the recording mark to be recorded by a single write pulse, is recorded by a write pulse of an n/2 write strategy, where T is one clock cycle and n is a natural number.

To achieve the aforementioned object, a eighth aspect of the present invention is the optical information recording method according to the aforementioned aspects, wherein when the recording mark is recorded by a single write pulse, a cooling pulse is inserted before the write pulse.

To achieve the aforementioned object, a ninth aspect of the present invention is the optical information recording method according to the aforementioned aspects, wherein the wavelength $\lambda$ of the laser beam is set to a value between 400 to 410 nm, and the numeral aperture NA is set to a value between 0.7 to 0.9.

To achieve the aforementioned object, a tenth aspect of the present invention is the optical information recording method according to the aforementioned aspects, wherein a shortest mark of all the marks is 125 nm or less.

To achieve the aforementioned object, a eleventh aspect of the present invention is an optical recording apparatus, including: a laser beam source for generating a laser beam; an objective lens for condensing the laser beam; and irradiation controller for irradiating an optical recording medium with a write pulse of the laser beam to record information, wherein the irradiation controller irradiates the optical recording medium with a single write pulse to form a recording mark, when the total length of the recording mark to be recorded and a space adjacent to the recording mark is less than a diameter of an effective reproduction spot, being $0.82\times(\lambda/NA)$, where $\lambda$ is a wavelength of a reproduction laser beam and NA is a numerical aperture.

To achieve the aforementioned object, a twelfth aspect of the present invention is the optical recording apparatus according to the aforementioned aspect, wherein the irradiation controller inserts a cooling pulse immediately before the single write pulse for starting formation of the write pulse.

The present invention has the advantage of being capable of increasing the recording accuracy of high-density recording on an optical recording medium.

BRIEF DESCRIPTION OF THE DRAWINGS

FIG. 4 is a table showing a relationship between the recording density and the write strategy;

FIG. 13 is a table showing evaluation results of recording quality of Example 1 and Comparative example 1; and FIG. 14 is a table showing evaluation results of recording quality of Comparative example 2.

DETAILED DESCRIPTION OF THE PREFERRED EMBODIMENTS

Embodiments of the present invention will be described in detail below with reference to the accompanying drawings.

Figure 1:
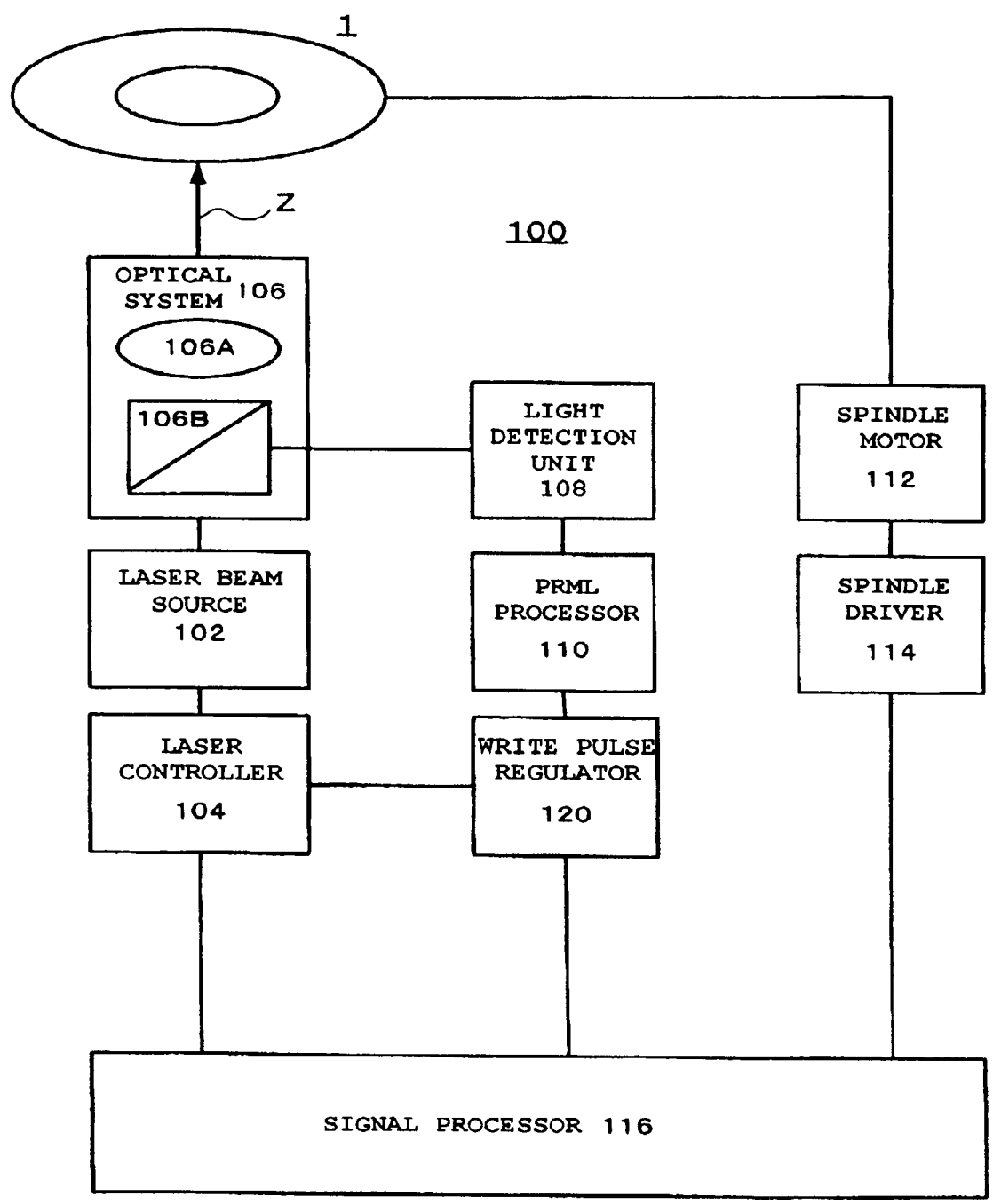
FIG. 1 is a block diagram of a recording reproduction apparatus for an optical recording medium according to a first embodiment of the present invention.

FIG. 1 shows a recording reproduction apparatus 100 which realizes an optical recording method according to a first embodiment of the present invention. The recording reproduction apparatus 100 includes a laser beam source 102 which generates a laser beam Z used for recording and reproduction, a laser controller (irradiation controlling means) 104 which controls the laser beam source 102, an optical system 106 which guides the laser beam Z to an optical recording medium 1, a light detection unit 108 which detects reflected light of the laser beam Z during reproduction, a PRML processor 110 which decodes detection information of the light detection unit 108 in the PRML detection scheme, a spindle motor 112 which rotates the optical recording medium 1, a spindle driver 114 which controls the rotation of the spindle motor 112, a signal processor 116 which exchanges decoded reproduction data with a central processing unit (CPU) not shown in the drawing, and a write pulse regulator 120 which initializes a write pulse waveform of the laser controller 104.

The laser beam source 102, which is a semiconductor laser, is controlled by the laser controller 104 to generate the laser beam Z. The optical system 106 includes an objective lens 106A and a polarizing beam splitter 106B, and can focus the laser beam Z onto an information recording layer accordingly. The polarizing beam splitter 106B picks up the reflected light from the information recording layer to guide it to the light detection unit 108. The light detection unit 108, which is a photodetector, receives the reflected light of the laser beam Z to convert it into an electric signal, and transmits it as a reproduction signal to the PRML processor 110. The PRML processor 110 decodes the reproduction signal, and transmits the decoded binary digital signal as reproduction data to the signal processor 116.

The recording reproduction apparatus 100 is also set to have a wavelength $\lambda$ of the laser beam Z of 400 to 410 nm, specifically to 405 nm, and an initial reproduction power of the laser beam Z of 0.35 mW. The objective lens 106A in the optical system 106 is also set to have a numerical aperture NA of 0.7 to 0.9, and specifically to 0.85. Accordingly, a diameter of an effective reproduction spot of the laser beam Z, being $0.82\times(\lambda/NA)$, is 391 nm during reproduction. It should be appreciated that the diameter means a diameter of the spot whose intensity is $1/e^2$ of a central intensity in the optical axis of a Gaussian beam.

The reproduction of the information recorded on the optical recording medium 1 is started in such a manner that the laser beam Z is generated from the laser beam source 102 so as to have a reproduction power level, and then irradiates the information recording layer of the optical recording medium 1. The laser beam Z is then reflected from the information recording layer, and picked up by the light detection unit 108 through the optical system 106 to turn to an electric signal. This electric signal is converted into a digital signal through the PRML processor 110 and the signal processor 116, and transmitted to the CPU.

Figure 2:
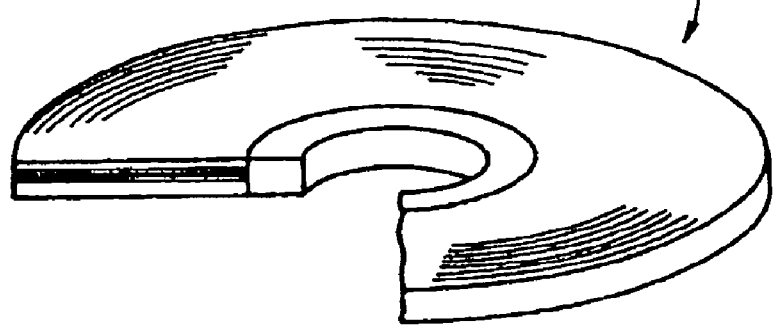
FIG. 2A is a perspective view showing the structure of the optical recording medium.
FIG. 2B is an enlarged cross-sectional view showing the structure of the optical recording medium.
Figure 2:
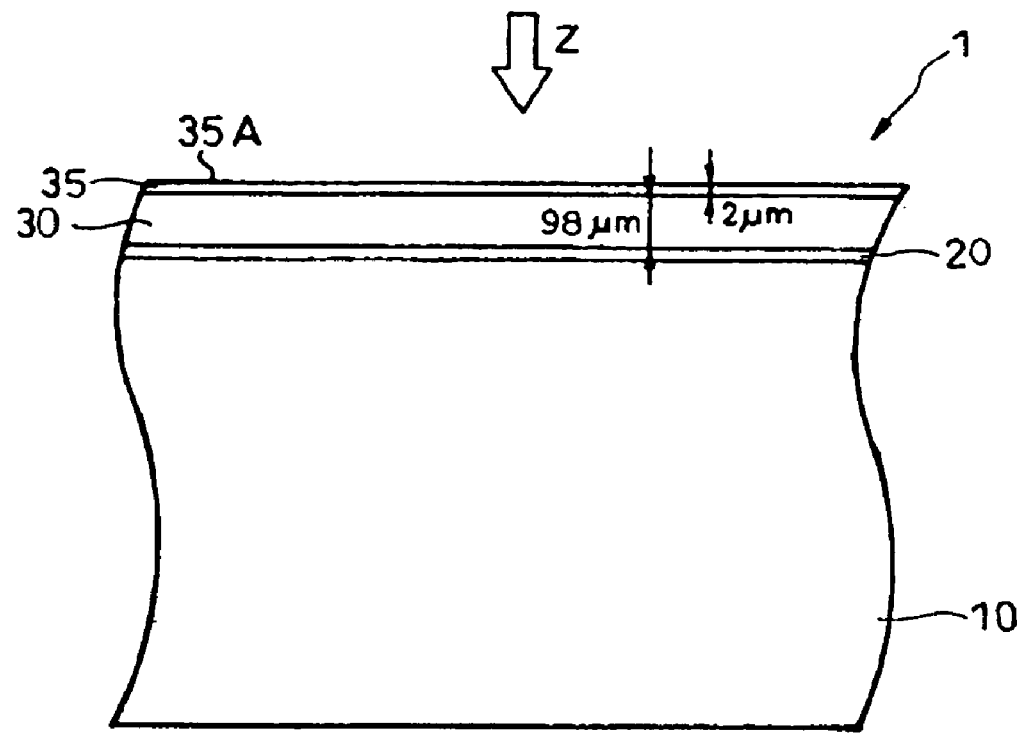

The optical recording medium 1 used for reproduction in the recording reproduction apparatus 100 will be described below. As shown in FIG. 2A, the optical recording medium 1 is a disc-shaped medium which has an outer diameter of approximately 120 mm and a thickness of approximately 1.2 mm. As shown in an enlarged view of FIG. 2B, the optical recording medium 1 is composed of a substrate 10, an information recording layer 20, a cover layer 30, and a hard coating layer 35, which are stacked in this order.

The cover layer 30 and the hard coating layer 35 are transmissive to the laser beam Z incident from the outside. Accordingly, the laser beam Z incident from a light incident surface 35A passes through the hard coating layer 35 and the cover layer 30 in this order into the information recording layer 20, to record and reproduce information on and from the information recording layer 20.

The substrate 10, which is a disk-shaped member with a thickness of approximately 1.1 mm, is made of any materials including, but not limited to, glass, ceramics, and resin, specifically to polycarbonate resin as described herein.

Examples of the resin may include not only polycarbonate resin but also olefin, acrylic, epoxy, polystyrene, polyethylene, polypropylene, silicone, fluorinated, ABS, and urethane resins.

In particular, polycarbonate and urethane resins are preferably used in light of processability and moldability. On the surface of the substrate 10 in the information recording layer side, grooves, lands, pit rows, and the like are formed depending on application.

The cover layer 30 may be made of any materials but required to be a transmissive material to transmit the laser beam Z as described above. As an example, an acrylic UV-curable resin is preferably used. In the optical recording medium 1, the cover layer 30 is designed to have a thickness of 98 µm, and the hard coating layer 35 is designed to have a thickness of 2 µm. The distance between the light incident surface 35A and the information recording layer 20 is, therefore, approximately 100 µm. The optical recording medium 1 conforms to the current Blu-ray disc standard, except for its storage capacity (25 GB at present).

The information recording layer 20, which is a layer in which data is stored, allows the user to write data. As types of data storage, there are write-once type, which does not allow the user to write data in an area where data has already been written, and rewritable type, which allows the user to erase the data which has already been written in the area and to rewrite data therein. In this embodiment, the rewritable type is taken as an example.

Figure 3:
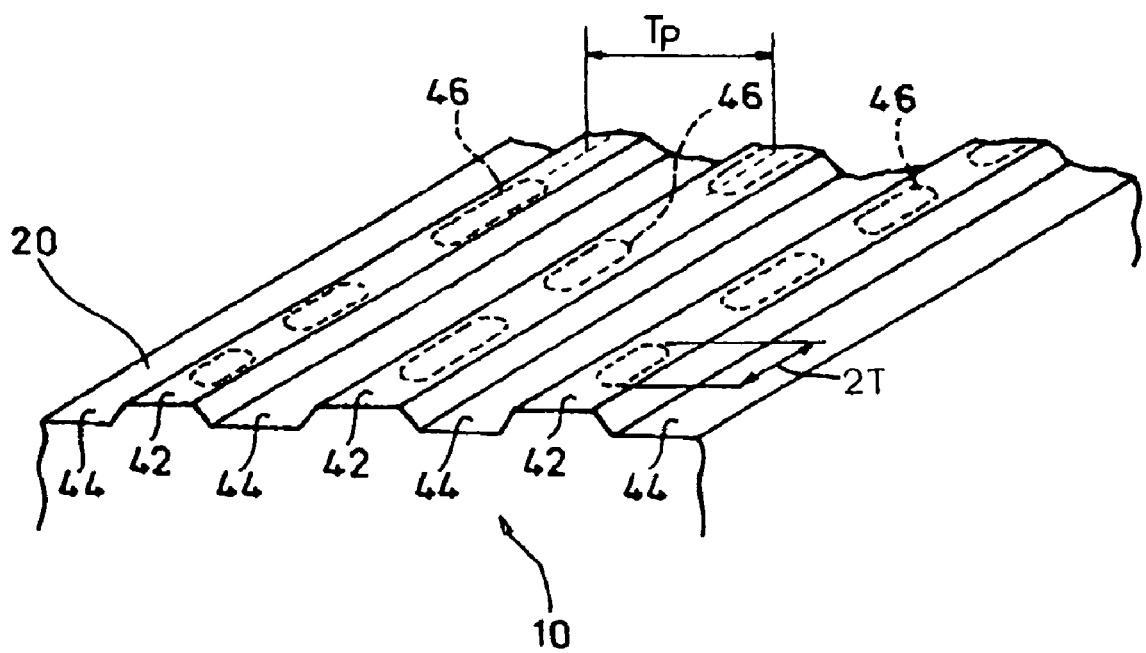
FIG. 3 is an enlarged perspective view showing data storage mode in the information recording layer of the optical recording medium.

As shown in FIG. 3, a spiral groove 42 (and land 44) is formed on the surface of the substrate 10, and the information recording layer 20 includes the groove 42. A recording film, which allows recording marks 46 to be formed thereon by the energy of the laser beam Z, is formed on the information recording layer 20. The groove 42 serves as a guide track for the laser beam Z during data recording. The recording marks 46 are formed on the information recording layer 20 in such a manner that the energy level (power) of the laser beam Z is modulated while the laser beam Z is moved along the groove 42. Since the type of data storage is the rewritable type here, the recording marks 46 are reversibly formed so as to allow erase and reformation. The case where the recording marks 46 are formed on the groove 42 is exemplified above, but the recording marks 46 may be formed on the land 44 or on both the groove 42 and the land 44.

The storage capacity of the information recording layer 20 depends on a combination of the size of the recording region (area) and the recording density. Since the recording region is physically limited, in the present embodiment, reducing the linear density of each recording mark 46, i.e., reducing the length of the unit recording mark 46 in the spiral direction increases the recording density, as shown in FIG. 3. Each of the length of the shortest recording mark (and the length of the shortest space) is set to a length corresponding to 2T, where T is one clock cycle. Note that the length corresponding to 2T means a distance the beam spot of the laser beam Z moves on the optical recording medium 1 for 2T. Reducing a track pitch Tp between recording tracks (being grooves 42 here) can increase the recording density as well. In the present embodiment, the track pitch Tp between the grooves 42 is set to 0.32 µm.

Accordingly, reducing the clock cycle T reduces the length of the recording mark 46 in the spiral direction formed on the information recording layer 20 and thus increases the storage capacity. In the present embodiment, the length of the shortest mark 2T is set to approximately 136 nm to approximately 106 nm, and specifically to 111.9 nm. When the length of the shortest mark 2T is set to 136 nm, the information recording layer 20 allows recording 27.3 GB data thereon. When the length of the shortest mark 2T is set to 124 nm, the information recording layer 20 allows recording 30 GB data thereon. When the length of the shortest mark 2T is set to 113 nm, the information recording layer 20 allows recording 33 GB data thereon. When the length of the shortest mark 2T is set to 106 nm, the information recording layer 20 allows recording 35 GB data thereon. Since the diameter of the effective reproduction spot of the laser beam is 391 nm or less as described above, 2T mark/2T space, 3T mark/2T space, and 4T mark/2T space each fall within the effective reproduction spot depending on the recording density, as shown in FIG. 4 (see the area represented by the bold frame W). In particular, when 29 GB or more storage capacity is wanted, the 4T mark/2T space always falls within the spot.

Accordingly, a part of another adjacent recording mark as well as the whole single recording mark is in the effective reproduction spot, so that the conventional write strategy without any modification distorts the reproduced waveform of the recording mark.

The PRML (Partial Response Maximum Likelihood) detection scheme performed by the PRML processor 110 will be described below. This PRML detection scheme is to estimate binary data recorded on the information recording layer 20 based on an electrical analog signal detected by the light detection unit 108. In the PRML detection scheme, constraint length 5 PR (1, 2, 2, 2, 1) characteristic is applied as the reference class characteristic of the Partial Response (PR), which is suitable for the reproduction characteristics. The constraint length 5 PR (1, 2, 2, 2, 1) characteristic means that the reproduction response to a sign bit of "1" constrains five bits and the waveform of the reproduction response is represented by a bit sequence of "12221." It is therefore estimated that the reproduction response to each sign bit actually recorded is formed by the convolution operation on the sequence "12221." For example, a response to a sign bit sequence of 00100000 is 00122210. Similarly, the response to a sign bit sequence of 00010000 is 00012221. Accordingly, the response to a sign bit sequence of 00110000 is 00134431 as a result of the convolution operation on the two responses. The response to a sign bit sequence of 001110000 is 001356531. Accordingly, in the convolution operation, the slice level for each bit is not determined, but it is required that the reproduction signal be decoded while taking a correlation between adjacent bits into consideration.

Note that it is assumed that the response obtained by the PR class characteristic is under ideal conditions. In that sense, the response is called an ideal response. However, an actual response, which contains noises and is distorted, does not match the ideal response. Consequently, the actual response with noises and the like is compared with expected ideal responses, an ideal response in which a difference (distance) between the actual response and the ideal responses is the smallest is chosen, and the chosen ideal response is determined as a decoded signal. This manner is called the Maximum Likelihood (ML) detection. When a reproduction signal in which a sign bit of "1" is approximated to "12221" by reproduction is obtained, the PRML detection processing using the constraint length 5 PR(1, 2, 2, 2, 1) makes it possible to promote the reproduction sequence as follows: reproduction signal→ideal response "12221"→decoded signal "1".

The ML detection uses the Euclidean distance to calculate a difference between an ideal response and an actual response. For example, the Euclidean distance E between an actual response sequence A (=A0, A1, . . . , An) and an ideal response sequence B (=B0, B1, . . . , Bn) is defined as E=√{Σ(Ai−Bi)²}.

Accordingly, an actual response is compared with a plurality of expected ideal responses using the Euclidean distance to rank the expected ideal responses. An ideal response (maximum likelihood response) with the smallest Euclidean distance is chosen, and the reproduction signal is decoded using the chosen ideal response.

The signal quality is evaluated in such a manner that data under the decode process of the PRML detection scheme in the PRML processor 110 is received, and an error rate or a sequenced amplitude margin (SAM) value is detected using the received data. In this instance, the SAM value is a difference between the Euclidean distance of the maximum likelihood ideal response and the Euclidean distance of the second ideal response as being the next rank. Accordingly, the quality of reproduction data can be determined either whether an evaluation result using an error rate or a SAM value satisfies predetermined criterion or whether an irrecoverable error occurs. The error rate and the SAM value are exemplified as the criterion here, but another manner may be used to determine the signal quality.

Moreover, in the present embodiment, when the total length of a recording mark to be recorded and a space adjacent to the recording mark is less than the diameter of the effective reproduction spot of 391 nm, the recording mark is recorded by a single write pulse. In this first embodiment, in particular, when the total length of the recording mark to be recorded and the space adjacent to the recording mark is less than the diameter of the effective reproduction spot, a single write pulse is used.

Figure 5:
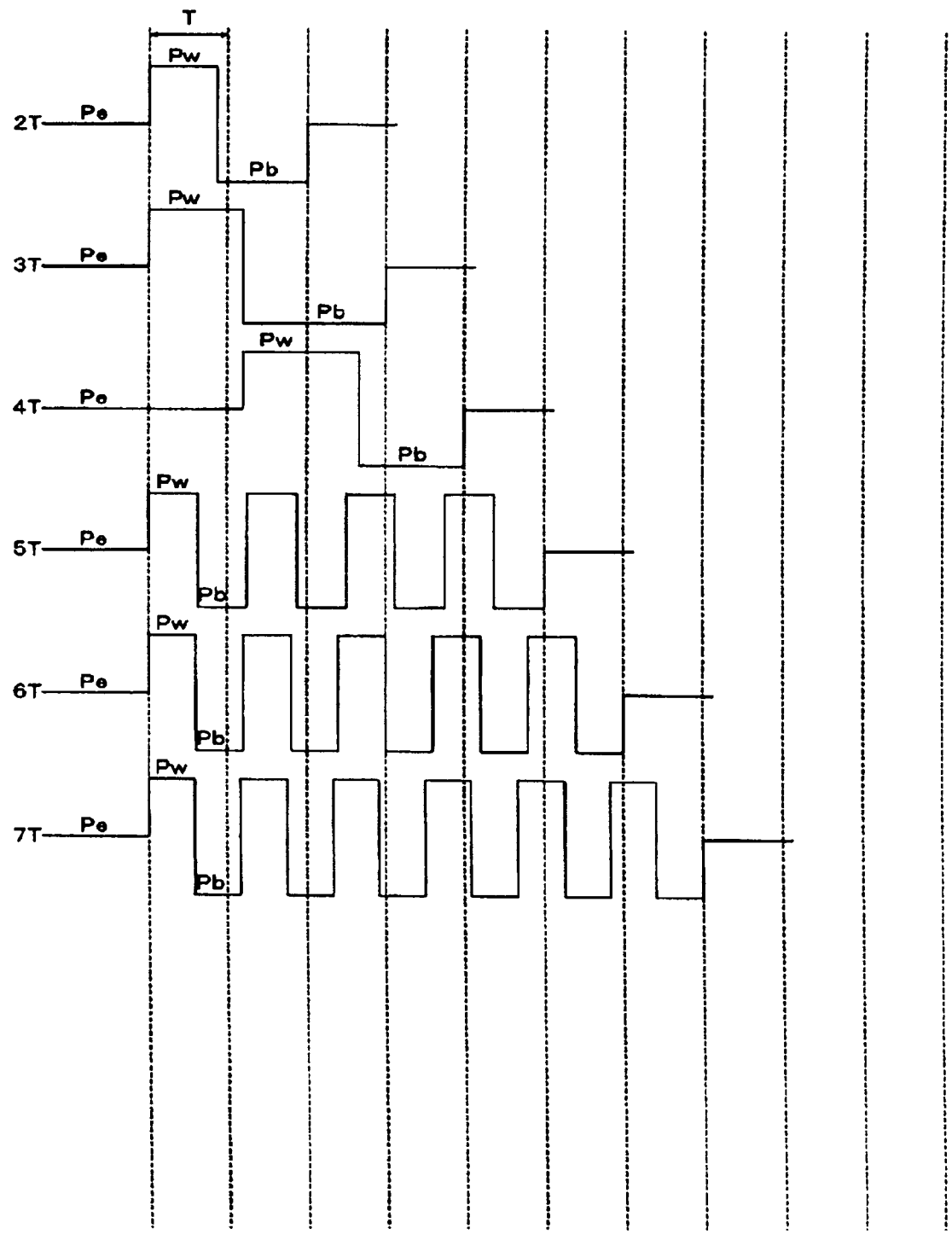
FIG. 5 is a timing chart showing a pulse waveform based on the write strategy conducted by the recording reproduction apparatus.

In the recording reproduction apparatus 100, the storage capacity of the optical recording medium 1 is set to 33.3 GB, which is greater than 29 GB, and the length of 2T, being the length of the shortest mark/space, is set to 111.9 nm, which is less than 136 nm. Accordingly, the total length of the 4T mark/2T space is set to 335.7 nm, which is less than 391 nm, so that the 4T mark/2T space falls within the effective reproduction spot. In this case, the 2T, 3T, and 4T marks are recorded by a single write pulse, as shown in FIG. 5. Writing the 2T, 3T, and 4T marks using the single write pulse can reduce the error rate, as will be described in detail later.

Conversely, when the total length of the mark/space is more than the diameter of the effective reproduction spot, an n−1 write strategy is applied to the recording mark. The n−1 write strategy is a method for recording an nT mark with a length corresponding to nT using n−1 write pulses, where n is a natural number. For example, for marks greater than the 4T mark, as shown in FIG. 5, the 5T mark is recorded by four write pulse waveforms, a 6T mark is recorded by five write pulse waveforms, and a 7T mark is recorded by six write pulse waveforms. While these write pulses are set to a write power level Pw, a bias pulse with a bias power level Pb for cooling is applied for a period, except the write pulse period in a period for one recording mark. An erase pulse with an erase power level Pe is applied for a period to a space other than the mark.

Figure 6:
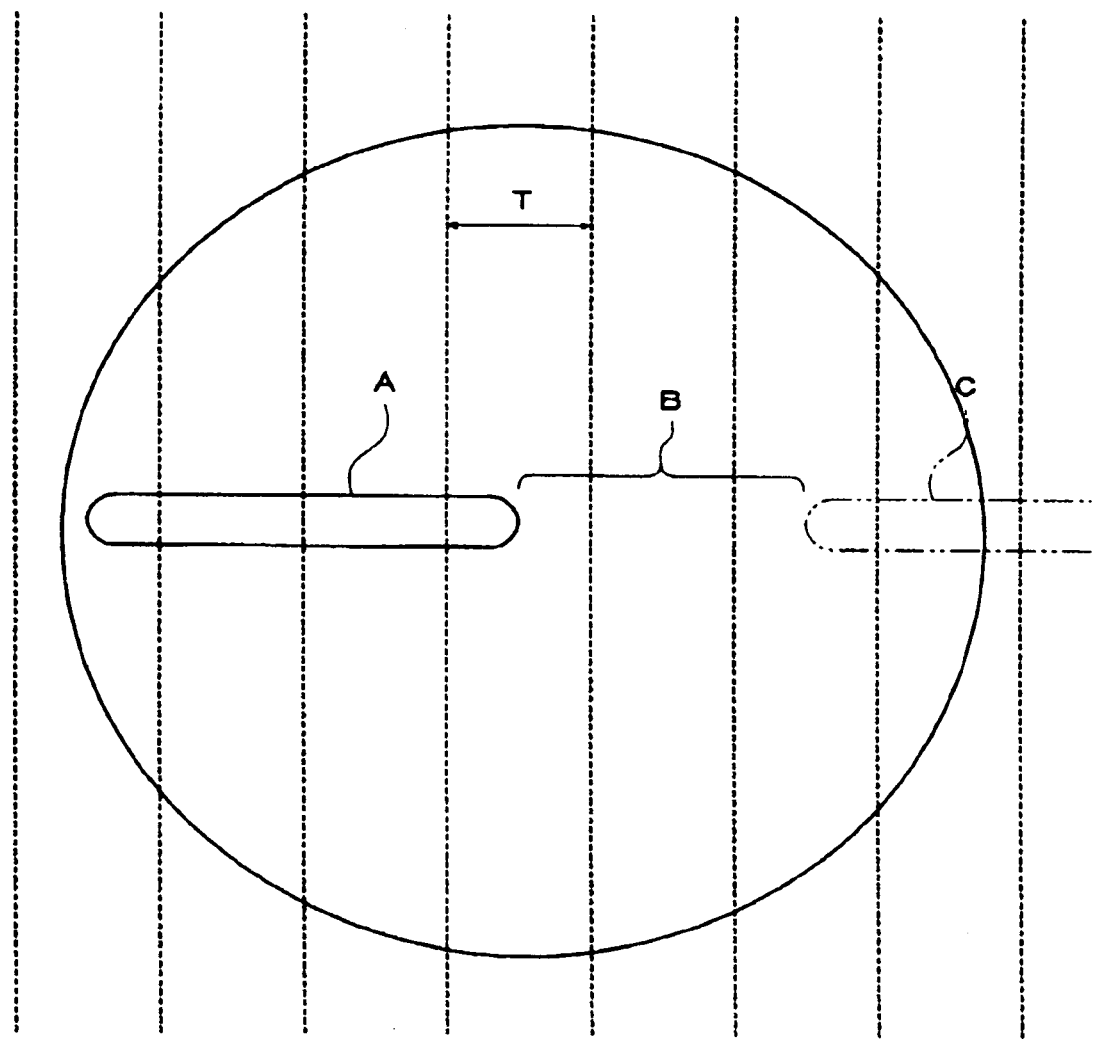
FIG. 6 is an enlarged view of a beam spot during recording.

As described above, the diameter of the effective reproduction spot is more than the total length of the 4T mark/2T space, i.e., the length corresponding to 6T. Accordingly, when the 2T, 3T, and 4T marks are reproduced, there is at least an area corresponding to 2T, in addition to the whole mark to be reproduced, in the effective reproduction spot. For example, when the following space is a 2T space, another following mark enters the effective reproduction spot in addition to the 2T space during reproduction of the 2T, 3T, and 4T marks. For example, when a pattern of a 3T mark A, a 2T space B, and a 2T mark C is reproduced, the whole 2T space B and approximately half the following 2T mark C are included in the effective reproduction spot during reproduction of the first 3T mark A as shown in FIG. 6, so that the reproduced waveform of the 3T mark A is distorted. Accordingly, writing the 3T mark A using a single write pulse in advance allows for preparation of the following 2T mark C entering the spot during reproduction. This reduces any distortion of the reproduced waveform, thereby increasing the recording accuracy.

Figure 7:
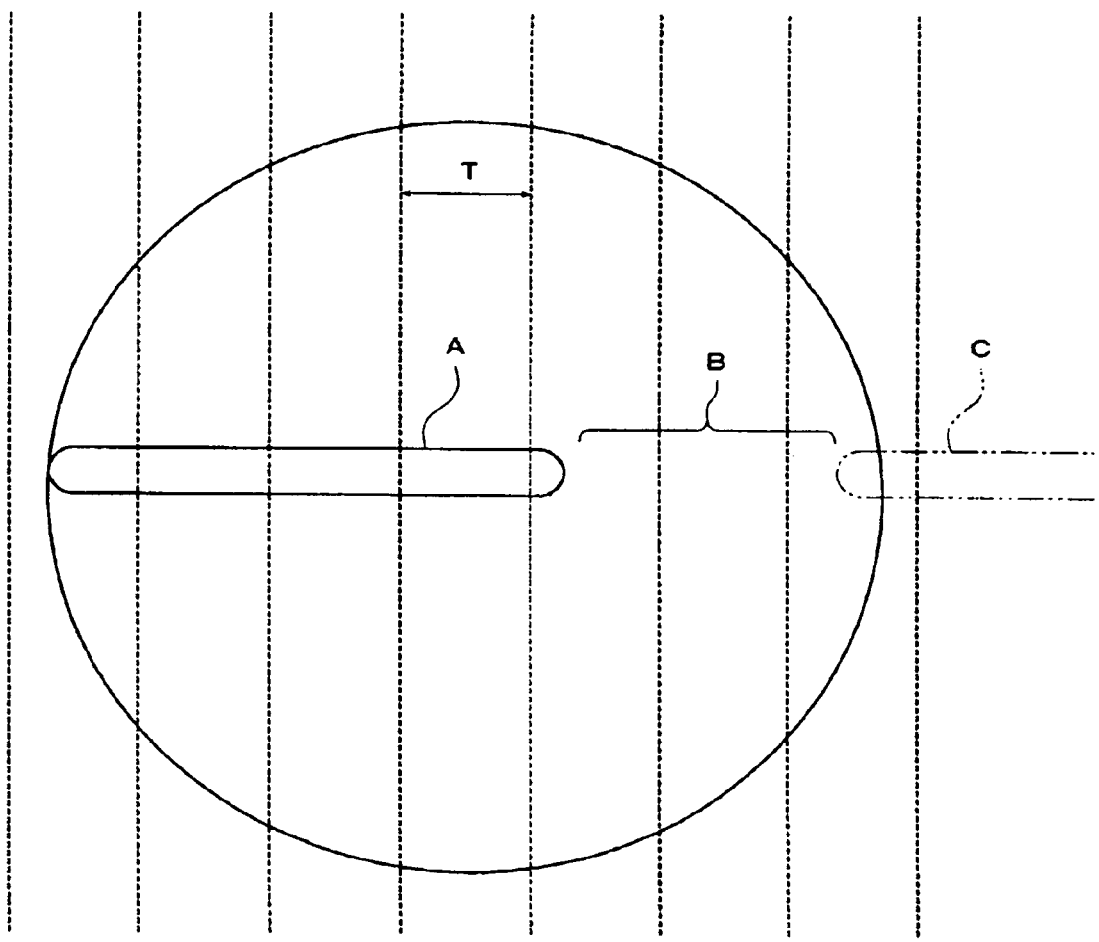
FIG. 7 is an enlarged view of a beam spot during recording.

As another example, as shown in FIG. 7, when a pattern of a 4T mark A, a 2T space B, and a 3T mark C is reproduced, the whole 4T space A, the whole 2T space B, and a top portion of the following 3T mark C are included in the effective reproduction spot during reproduction of the first 4T mark A. Accordingly, writing the 4T mark A using a single write pulse (not multiple pulses) allows for recording in light of any interference occurring during reproduction, thereby bringing the reproduced waveform close to an ideal waveform.

In particular, the 2T, 3T, and 4T marks have an area smaller than another mark that is longer than those marks, and thus the 2T, 3T, and 4T marks have a large distortion effect (ratio) on a reproduced waveform, thereby facilitating the variation in level and causing read errors. Consequently, the use of a single pulse for the 2T, 3T, and 4T marks, depending on their conditions, allows for high-density recording.

It should be appreciated that the present invention is not limited to the case where the 4T mark is recorded by a single write pulse. For example, if setting the diameter of the effective reproduction spot to a smaller value does not allow the 4T mark/2T space to fall within the effective reproduction spot, the 4T mark may be recorded by multiple write pulses.

Moreover, in the present embodiment, only when a space following the 2T, 3T, and 4T mark is 2T (being the shortest), those marks are recorded by a single write pulse, and when the following space is not a 2T space, those marks are recorded by an n−1 write strategy, i.e., a single write pulse for the 2T mark, two write pulses for the 3T mark, and three write pulses for the 4T mark. However, the present invention is not limited to this example. For example, a set of 2T mark/3T space, a set of 3T mark/3T space, and a set of 2T mark/4T space allow for interference in the reproduced waveforms of the marks, but it is a small effect compared with the case of the 2T space being the shortest, because those marks may fall within the effective reproduction spot. Accordingly, even if the length of a space following a mark is 3T or more, the mark/space whose total length is less than the diameter of the effective reproduction spot is preferably recorded by a single write pulse in order to reduce read errors.

Figure 8:
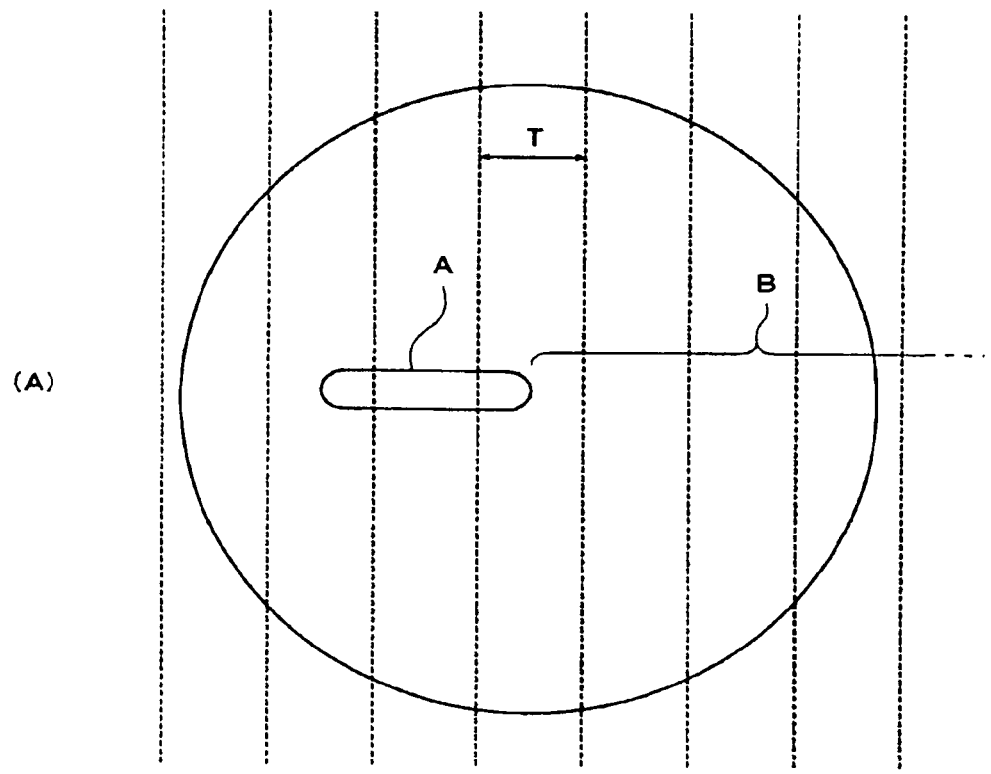
FIGS. 8A and 8B are enlarged views of a beam spot during recording.
Figure 8:
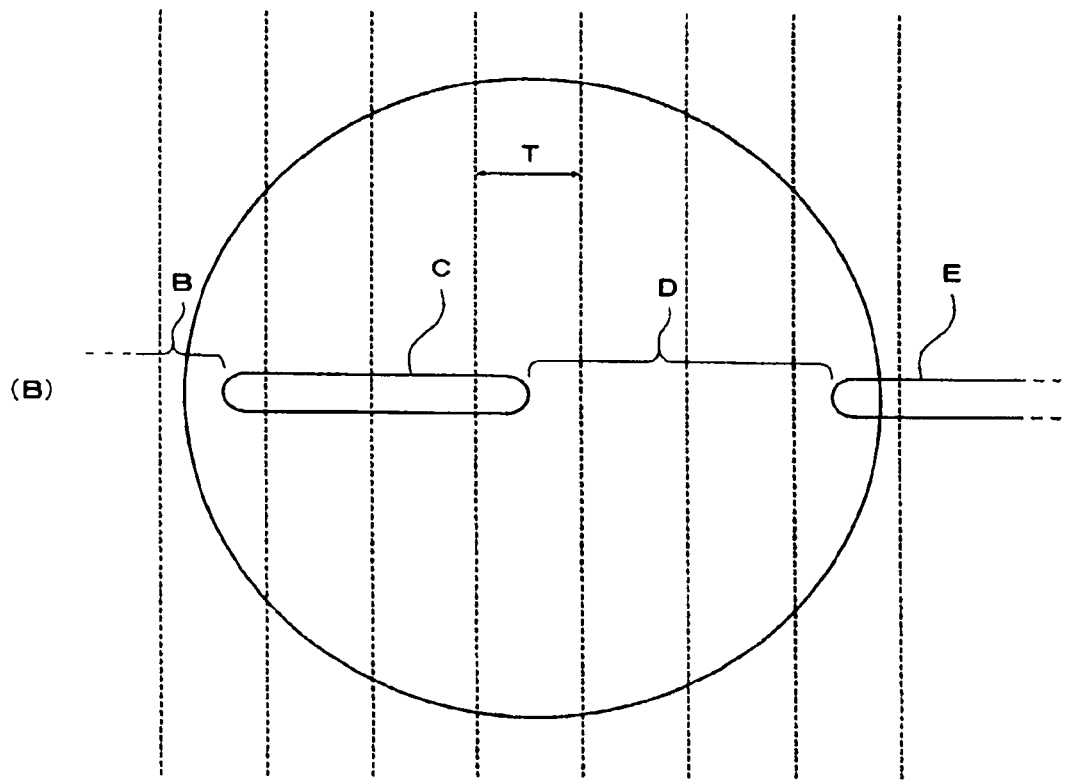

For example, when a pattern of a 2T mark A, a 5T space B, a 3T mark C, a 3T space D, and a 3T mark E is reproduced, during reproduction of the first 2T mark A, as shown in FIG. 8A, the following 3T mark C does not enter the effective reproduction spot due to the 5T space B. Therefore, the first 2T mark A is recorded in advance by two write pulses. Conversely, during reproduction of the following 3T mark C as shown in FIG. 8B, due to the following 3T space D, a top portion of the following 3T mark E enters the effective reproduction spot. Accordingly, unlike the 2T mark A, the 3T mark C is recorded in advance by a single write pulse. This allows for reduced distortion of the reproduced waveform even if the following 3T mark E interferes in the 3T mark C during reproduction, thereby reducing read errors.

As seen from the results described above, in particular, the shortest space (being 2T here) is preferably recorded by a single write pulse because the space is sufficiently interfered with by marks on both sides.

Figure 9:
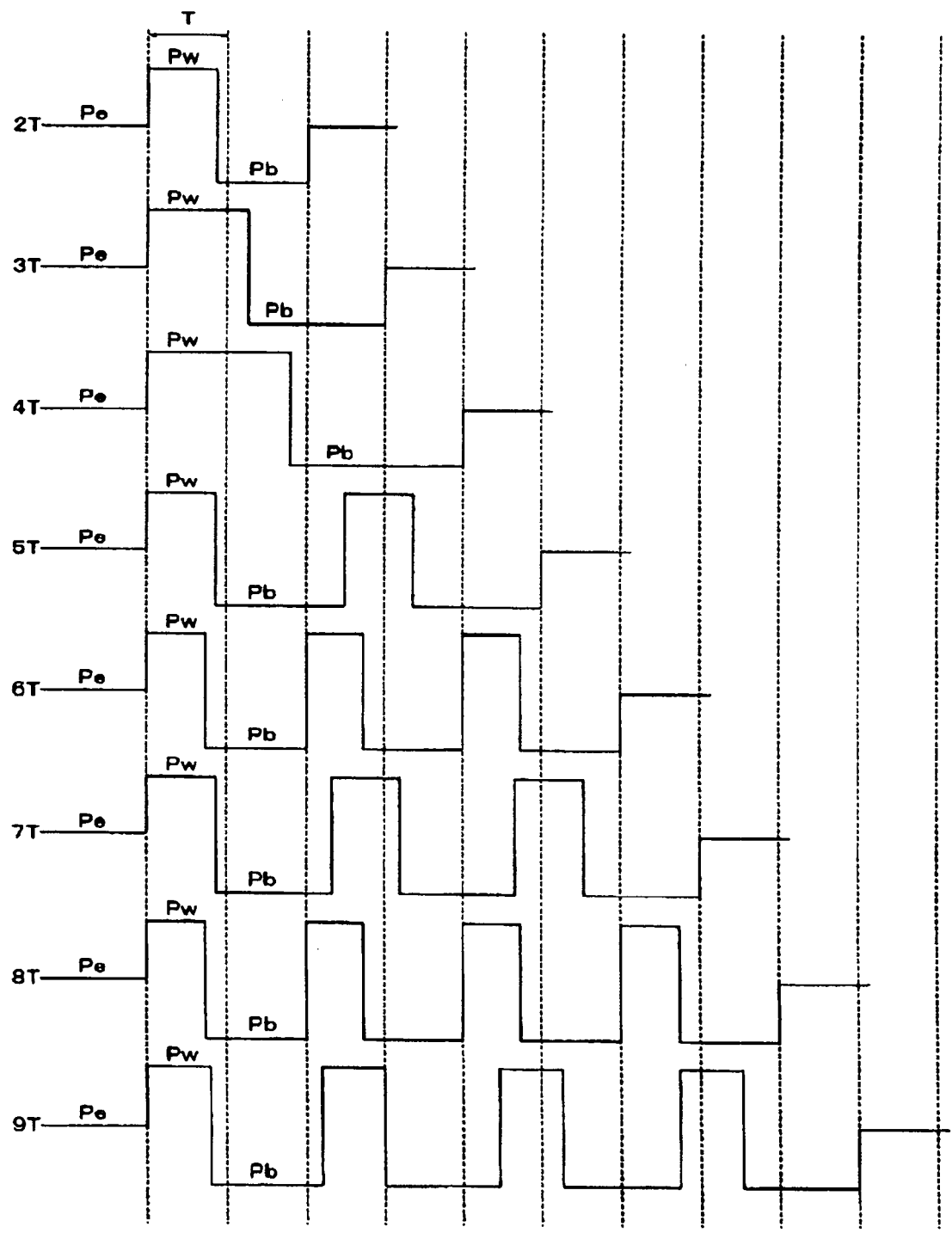
FIG. 9 is a timing chart showing a pulse waveform based on a write strategy of a second embodiment.

An optical recording method according to a second embodiment will be described below. The recording reproduction apparatus used in this optical recording method is the same as that of the first embodiment, and therefore a further explanation and illustration of such will not be provided. The optical recording method according to the second embodiment uses an n/2 write strategy for marks not to be recorded by a single pulse. The n/2 write strategy is a method for recording an nT mark with a length corresponding to nT using m=n/2 write pulses, where n is a natural number and m is an integer and rounded down to the left of the decimal point. For example, for the marks of more than a 5T mark, as shown in FIG. 9, the 5T mark is recorded by two write pulse waveforms (a start write pulse and an end write pulse), the 6T and 7T marks are recorded by three write pulse waveforms (a start write pulse, a middle write pulse, and an end write pulse), and the 8T and 9T marks are recorded by four write pulse waveforms.

In this second embodiment, when the total length of the recording mark to be recorded and one of the spaces placed immediately before and after the recording mark is less than the diameter of the effective reproduction spot, being 0.82× (λ/NA), the recording mark is recorded by a single write pulse. In other words, even when the total length of the recording mark to be recorded and a space placed immediately before the recording mark is less than the diameter of the effective reproduction spot, the recording mark is recorded in advance by the single write pulse. Needless to say, when the total length of the recording mark to be recorded and a space placed immediately after the recording mark is less than the diameter of the effective reproduction spot, the recording mark is also recorded by the single write pulse.

Figure 10:
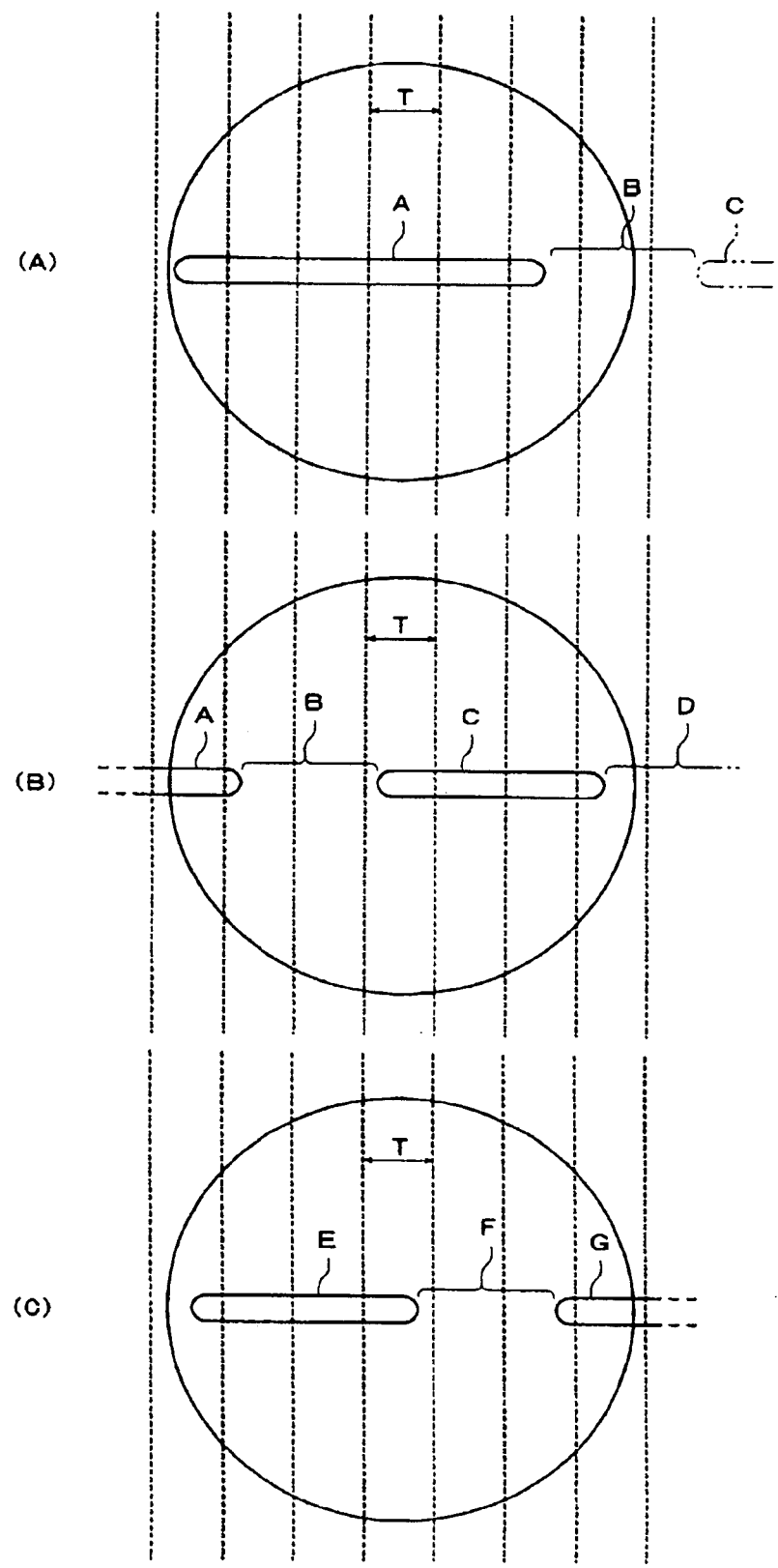
FIGS. 10A to 10C are enlarged views of a beam spot during recording.

For example, when a pattern of a 5T mark A, a 2T space B, a 3T mark C, a 4T space D, a 3T mark E, a 2T space F, and a 3T mark G is reproduced, during reproduction of the first 5T mark A, as shown in FIG. 10A, the following 3T mark C does not enter the effective reproduction spot because the 5T mark A is long. Therefore, the first 5T mark A is recorded in advance by two write pulses. Conversely, during reproduction of the 3T mark C, as shown in FIG. 10B, due to the prior 2T space B, an end portion of the further prior 5T mark A remains in the effective reproduction spot, thereby distorting the reproduced waveform. Accordingly, unlike the 5T mark A, the 3T mark C is recorded in advance by a single write pulse.

This allows for reduced distortion of the reproduced waveform even if the remaining 5T mark A interferes in the 3T mark C during reproduction, thereby reducing read errors. Note that the 3T mark C is not interfered with by the following 3T mark E because the following 4T space D is long. After that, when the 3T mark E is reproduced as shown in FIG. 10C, the 3T mark G enters the effective reproduction spot because the following 2T space F is short, thereby distorting the reproduced waveform. As a result, the 3T mark E is recorded in advance by a single write pulse.

As described above, choosing a write strategy of a recording mark accordingly in light of both the spaces immediately before and after the recording mark to be reproduced allows further reduced read error.

Figure 11:
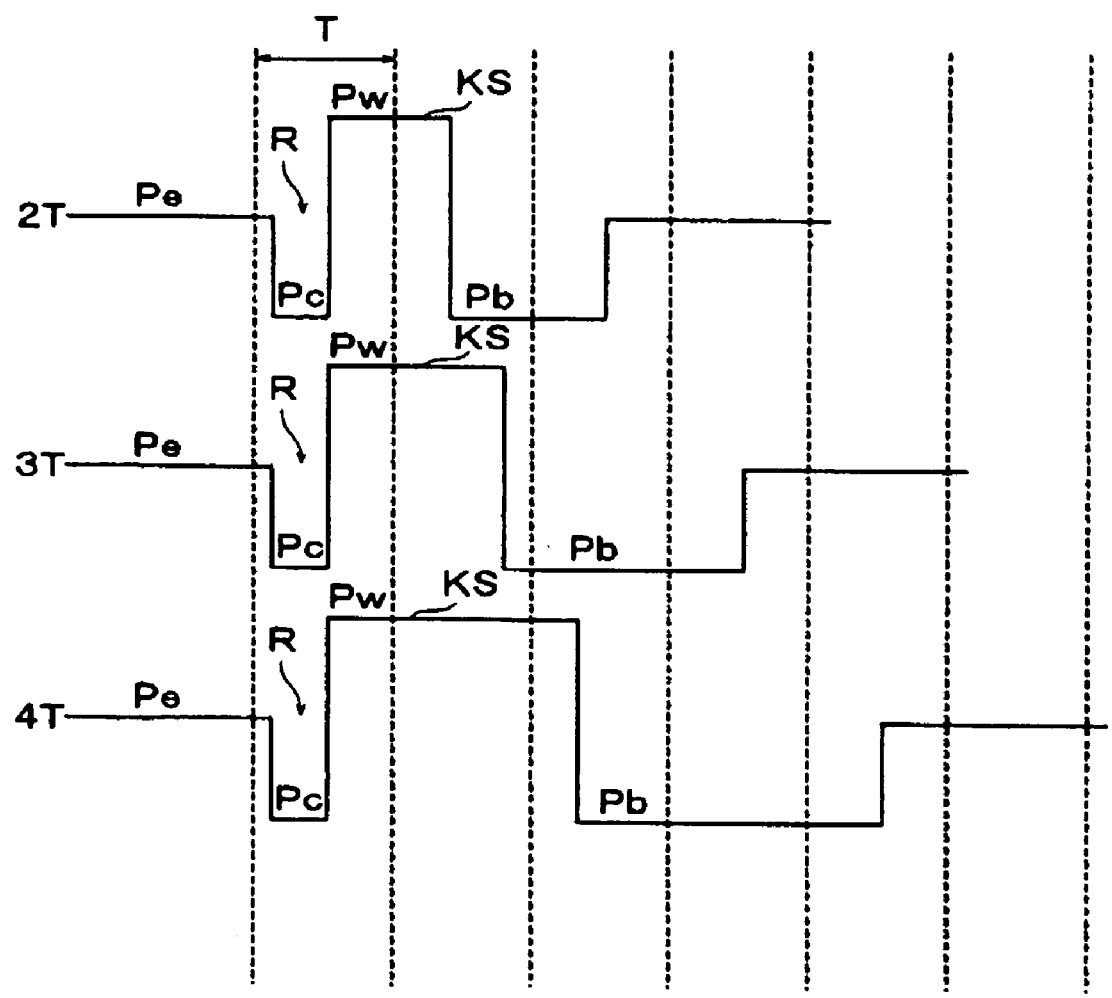
FIG. 11 is a timing chart showing a pulse waveform based on a write strategy of a third embodiment.

An optical recording method according to a third embodiment will now be described below. The recording reproduction apparatus used in this optical recording method is the same as that of the first embodiment, except for insertion of a cooling pulse described later, and therefore a further explanation and illustration of such will not be provided. In the optical recording method according to the third embodiment, as shown in FIG. 11, for a recording mark to be recorded in advance by a single write pulse, a cooling pulse R is inserted immediately before the single write pulse KS. Note that a cooling power level Pc of the cooling pulse R is set to a value less than the erase power level Pe. However, in the present embodiment, the cooling power level Pc is set to the same value as the bias power level Pb, and the 2T, 3T, and 4T marks are recorded by a single write pulse.

According to the optical recording method of the third embodiment, since the cooling pulse R is inserted immediately before the write pulse KS at the start side which starts writing of the mark, it is possible to prevent a heat of the erase pulse applied to the last space from affecting the mark. Accordingly, this prevents over heating, thereby suppressing an interference with the adjacent recording marks in reproduction.

EXAMPLE 1 AND COMPARATIVE EXAMPLE 1

Recording experiments for an optical recording medium allowing up to 2× write speed were performed using the recording reproduction apparatus 100 of the present embodiment which has a recording reproduced wavelength λ of 405 nm, a numerical aperture NA of 0.85, and a diameter of an effective reproduction spot, being 0.82×(λ/NA), of 391 nm. The optical recording medium used had a storage capacity of 30 GB under recording conditions where the clock cycle T was 15.15 nsec and the write speed was 4.1 m/sec. A random pattern bit array was recorded in the optical recording medium. To evaluate its recording accuracy, the reproduction quality of the recording pattern was evaluated using the Partial Response Signal to Noise Ratio (PRSNR) and the Simulated bit Error Rate (SbER). The PRSNR is an evaluation method which can simultaneously provide a signal to noise ratio of a reproduction signal, and the linearity of an actual reproduction signal and an ideal response, and the greater its value, the better the signal quality. In this instance, a PRSNR measurement board manufactured by Pulstec Industrial Co., Ltd. was used for the evaluation. The SbER is a method in which SAM values for a plurality of reproduction signals are calculated, and an occurrence rate of read errors is evaluated based on the average and the standard deviation of the normal distribution obtained from the SAM values, and the less its value, the better the signal quality. In this instance, an SbER measurement unit manufactured by Pulstec Industrial Co., Ltd. was used.

Figure 12:
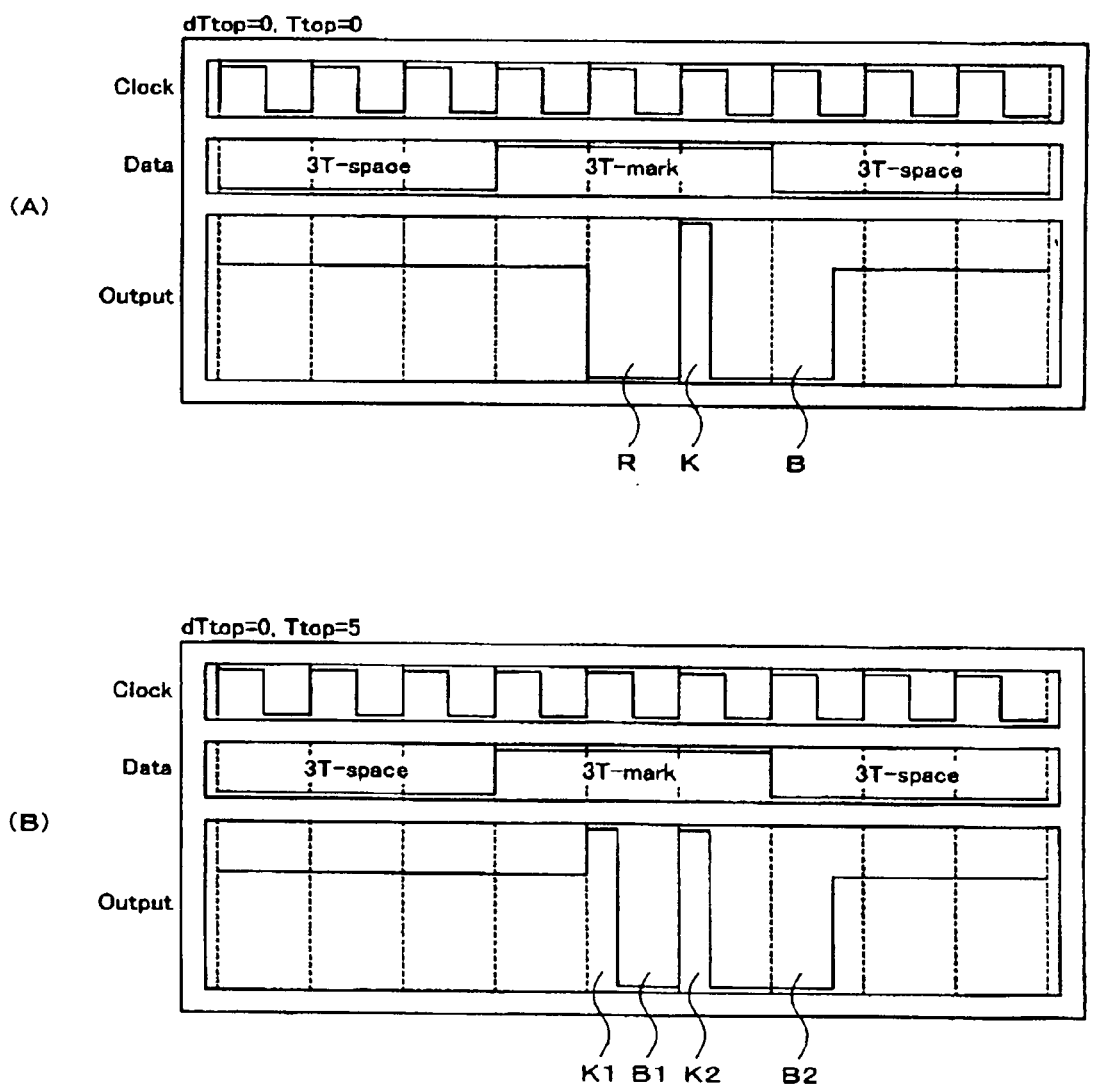
FIG. 12 is a timing chart showing a pulse waveform of Example 1 and Comparative example 1.

With a write strategy, when the whole adjacent recording mark/space fell within an effective reproduction spot, i.e., when a set of a 2T recording mark and a 2T space, a set of a 3T recording mark and a 2T space, or a set of a 4T recording mark and a 2T space was recorded, each recording mark was recorded using a single write pulse. The other recording marks were recorded using write pulses of a normal n−1 write strategy. FIG. 12A shows a pulse waveform of a 3T mark for reference. When the 3T mark was recorded, a single write pulse K was used and a cooling pulse R was inserted immediately before the write pulse. The following bias pulse B was extended backward from the end of the 3T mark to be formed so that the cooling time was as long as possible. This avoided poor cooling.

As Comparative example 1, a normal n−1 write strategy was used for recording all random patterns, and the quality of the reproduction signal was evaluated. As shown in FIG. 12B, the pulse waveform for the 3T mark in Comparative example 1 consisted of two write pulses K1 and K2 and two bias pulses B1 and B2. The verification was performed so that the results were as highly accurate as possible by changing the pulse width of the write pulse K1 at the start side, and the results were compared with Example 1.

FIG. 13 shows values of the best quality PRSNR and SbER obtained by Comparative example 1 and a value of the quality obtained by Example 1. As shown in FIG. 13, with SbER, while the best quality (being the minimum value) obtained by Comparative example 1 was 3.4E-06, the quality obtained by Example 1 was 5.5E-07, which is less than that of Comparative example 1. As a result, it was found that Example 1 was superior to Comparative example 1 with respect to signal quality. With PRSNR, while the best value obtained by Comparative example 1 was 15.8, the best value obtained by Example 1 was 16.8. Similarly, it was found that Example 1 was superior to Comparative example 1 with respect to signal quality.

Accordingly, it was found that the recording accuracy obtained by Example 1 was better given the results of both the SbER and PRSNR.

COMPARATIVE EXAMPLE 2

Recording experiments using a random pattern for an optical recording medium were performed using the recording reproduction apparatus 100 of the present embodiment which has a recording reproduction wavelength λ of 405 nm, a numerical aperture NA of 0.85, and a diameter of an effective reproduction spot, being 0.82×(λ/NA), of 391 nm, under conditions where the length corresponding to 1T was 74.5 nm and the storage capacity was 25 GB. As a write strategy, the write strategy corresponding to that used in Example 1 and a write strategy corresponding to that used in Comparative example 1 were used. FIG. 14 shows evaluation results of the recording accuracy. With SbER, while the reproduction quality (the minimum value) of the recording data obtained by the write strategy corresponding to that in Comparative example 1 was 4.6E-08, the reproduction quality of recording data obtained by the write strategy corresponding to that in Example 1 was 3.9E-08. As a result, the reproduction quality in Example 1 was a little bit better. With PRSNR, while the best reproduction quality (the maximum value) corresponding to that in Comparative example 1 was 23.0, the reproduction quality corresponding to that in Example 1 was 22.3. As a result, the write strategy corresponding to that in Comparative example 1 was definitely better.

As described above, the present embodiments are described for the case where the information recording layer in the optical recording medium is a single layer, however, the present invention is not limited thereto, and is also applicable to multilayer structure. In such a case, the recording method according to the present invention is preferably applied selectively to each information recording layer in a multilayer structure. Specifically, it is preferable that the recording method according to the present invention be used for the recording layer close to the laser beam, and another recording method be used for a recording layer located further away from the laser beam because the recording layer exhibits high heat radiation.

It should be appreciated by one skilled in the art that the recording method according to the present invention is not limited to the above-detailed embodiments, and various modifications may be made thereto without departing from the scope thereof.

According to the present invention, the best recording conditions can be set even if the storage capacity or the recording density is increased, thereby increasing the reproduction quality.

The entire disclosure of Japanese Patent Application No. 2006-202931 filed on Jul. 26, 2006 including specification, claims, drawings, and summary are incorporated herein by reference in its entirety.

What is claimed is:

1. An optical information recording method for recording information on an optical recording medium comprising irradiation of a laser beam having a write power and reproducing power used to perform reproduction in a reproduction system using a PRML (Partial Response Maximum Likelihood) detection means, and:
    changing a write strategy of a recording mark according to a total length of a recording mark to be recorded and one of the spaces placed immediately before or after the recording mark
    wherein the write strategy of a recording mark is changed by whether the total length of the recording mark to be recorded and one of the spaces placed immediately before or after the recording mark is less than a diameter of an affective reproduction spot, being $0.82 \times (\lambda/NA)$, where $\lambda$ is a wavelength of a reproduction laser beam and NA is a numerical aperture.

2. The optical information recording method according to claim 1, wherein when the recording mark is recorded by a single write pulse, a cooling pulse is inserted before the write pulse.

3. The optical information recording method according to claim 1, wherein the wavelength $\lambda$ of the laser beam is set to a value between 400 to 410 nm, and the numeral aperture NA is set to a value between 0.7 to 0.9.

4. The optical information recording method according to claim 1, wherein a shortest mark of all the marks is 125 nm or less.

5. The optical information recording method according to claim 1, wherein the recording mark comprising nT recording mark with a length corresponding to nT;
    and the write strategy of the nT recording mark is changed to a single write pulse strategy when the total length of the nT recording mark to be recorded and one of the spaces placed immediately before or after the nT recording mark less than the diameter of the effective reproduction spot; and
    is changed to an n−1 write pulse strategy or an n/2 write pulse strategy when the total length of the nT recording mark to be recorded and one of the spaces placed immediately before or after the nT recording mark is longer than the diameter of the effective reproduction spot.

6. The optical information recording method according to claim 1,
    wherein a length corresponding to 6T is less than the diameter of the effective reproduction spot where T is one clock cycle.

7. The optical information recording method according to claim 1,
    wherein the write strategy of a recording mark is changed by whether the total length of the recording mark to be recorded and one of the spaces placed immediately before or after the recording mark is less than a length corresponding to 6T where T is one clock cycle.

8. An optical recording apparatus, comprising:
    a laser beam source for generating a laser beam;
    an objective lens for condensing the laser beam; and
    irradiation controller for irradiating an optical recording medium with a write pulse of the laser beam to record information, wherein
    the irradiation controller changes a write strategy of a recording mark according to a total length of a recording mark to be recorded and one of the spaces placed immediately before or after the recording mark and
    wherein the irradiation controller changes the write strategy of a recording mark according to whether the total length of the recording mark to be recorded and one of the spaces placed immediately before or after the recording mark is less than a diameter of an effective reproduction spot, being $0.82 \times (\lambda/NA)$, where $\lambda$ is a wavelength of a reproduction laser beam and NA is a numerical aperture.

* * * * *